(12) United States Patent
Kawai et al.

(10) Patent No.: US 7,848,882 B2
(45) Date of Patent: Dec. 7, 2010

(54) DEVICE AND METHOD FOR EXECUTING VEHICLE-MOUNTED MAN-MACHINE INTERFACE

(75) Inventors: Seigo Kawai, Hachiouji (JP); Makoto Takahashi, Oume (JP); Eiji Hirako, Kitamoto (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 1098 days.

(21) Appl. No.: 10/582,949

(22) PCT Filed: Dec. 16, 2004

(86) PCT No.: PCT/JP2004/019279

§ 371 (c)(1),
(2), (4) Date: Jun. 15, 2006

(87) PCT Pub. No.: WO2005/058652

PCT Pub. Date: Jun. 30, 2005

(65) Prior Publication Data
US 2007/0124070 A1   May 31, 2007

(30) Foreign Application Priority Data
Dec. 17, 2003   (JP) .............................. 2003-419365

(51) Int. Cl.
*G01C 21/00* (2006.01)
(52) U.S. Cl. .................. 701/211; 701/200; 701/201; 340/990; 340/439; 340/438; 345/173; 345/172; 345/169
(58) Field of Classification Search ................ 701/211, 701/200, 201; 340/990, 439, 438; 345/173, 345/172, 169
See application file for complete search history.

(56) References Cited

U.S. PATENT DOCUMENTS 6,121,960 A  *  9/2000  Carroll et al. ............... 345/173

(Continued)

FOREIGN PATENT DOCUMENTS

JP   59-161224   10/1984

(Continued)

OTHER PUBLICATIONS

International Search Report for PCT/JP2004/019279.

(Continued)

*Primary Examiner*—Thomas G Black
*Assistant Examiner*—Wae Louie
(74) *Attorney, Agent, or Firm*—Eric J. Robinson; Robinson Intellectual Property Law Office, P.C.

(57) ABSTRACT

A vehicle-mounted man-machine interface device comprises display means for displaying a screen, press position detecting means for detecting the press position on the screen, and control means for displaying an operating screen on which operating figures are arranged on the display means and acquiring the operation content specified by the press on the operating screen from the arrangement positions of the operating figures, the operation on each operating figure, and the output of the press position detecting means. The device further comprises traveling detecting means for detecting whether or not the vehicle having the device is traveling or detecting the traveling speed of the vehicle. The control manes sets or alters one or both of the number of operating figures simultaneously displayed on the operating screen and their sizes according to the output from the traveling detecting means. With this, a man-machine interface technique for easily and reliably performing operation can be provided.

10 Claims, 7 Drawing Sheets

U.S. PATENT DOCUMENTS

| | | | |
|---|---|---|---|
| 6,356,812 B1 * | 3/2002 | Cragun | 701/1 |
| 6,909,947 B2 * | 6/2005 | Douros et al. | 701/29 |
| 6,972,749 B2 * | 12/2005 | Hinckley et al. | 345/173 |
| 6,974,326 B2 * | 12/2005 | Marple-Horvat | 434/236 |
| 6,995,663 B2 * | 2/2006 | Geisler et al. | 340/439 |
| 7,415,352 B2 * | 8/2008 | Olcott | 701/211 |
| 7,561,966 B2 * | 7/2009 | Nakamura et al. | 701/211 |
| 2004/0243307 A1 * | 12/2004 | Geelen | 701/213 |
| 2007/0124070 A1 * | 5/2007 | Kawai et al. | 701/211 |
| 2009/0138194 A1 * | 5/2009 | Geelen | 701/201 |

FOREIGN PATENT DOCUMENTS

| | | |
|---|---|---|
| JP | 01-028047 | 1/1989 |
| JP | 64-028047 | 1/1989 |
| JP | 03-116193 | 5/1991 |
| JP | 2003-307422 | 10/2003 |

OTHER PUBLICATIONS

International Preliminary Examination Report of Aug. 31, 2006 for PCT/JP2004/019279.

Office Action (Application No. 2003-419365) dated Sep. 17, 2008.

EP Supplementary Search Report (Application No. 04807636.8) dated Dec. 17, 2009.

Office Action (JP 2003-419365) dated Mar. 25, 2009.

\* cited by examiner

DEVICE AND METHOD FOR EXECUTING VEHICLE-MOUNTED MAN-MACHINE INTERFACE

TECHNICAL FIELD

The present invention relates to a man-machine interface technique in a vehicle-mounted device.

BACKGROUND ART

In a conventional vehicle-mounted CD/MD receiver comprising a display device and a touch panel which function as a man-machine interface, an operating screen on which dedicated operating key figures assigned to respective functions are arranged is displayed to allow operation corresponding to each operating key by pressing the operating key though the touch panel. In some cases, an inferior adjustment mode operating screen is displayed by pressing a menu key or the like, and operation is performed by, e.g., pressing an operating key within the operating screen.

FIG. 2 illustrates the outer appearance of such a conventional CD/MD receiver. This device comprises a display 1 for displaying a screen and a touch panel 2 for pressing the displayed screen on the display 1, thereby inputting coordinates corresponding to the press position. The device displays an operating screen 21 on which operating keys 20 and 23 to 30 corresponding to operations for executing respective functions are arranged. The device is configured to acquire operation content specified by a press on the operating screen 21 from the display positions of the operating keys, operations corresponding to the operating keys, and input coordinates obtained from the touch panel 2.

As a vehicle information display device such as car navigation equipment having a man-machine interface like the CD/MD receiver, a device which switches the combination of the colors of drawing elements in an operating screen depending on whether a vehicle is at a stop or traveling or whether the device is used in the daytime or at night is proposed in, e.g., Japanese Patent Laid-Open No. 7-191612. According to the document, since this device displays input keys inoperable and ones operable at the time of traveling such that they can be easily discriminated from each other, it is possible to safely operate an input key even at the time of traveling and reduce unnecessary input operation.

However, since the conventional CD/MD receiver requires each operating key to be operated while carefully looking at a displayed screen, it is difficult to operate the operating key while a vehicle is traveling. For this reason, operation of an operating key needs to be performed after the vehicle is stopped. That is, operation at the time of traveling has several problems. More specifically, it may be impossible to easily recognize which one of displayed operating keys is to be pressed. An operating key adjacent to one desired to be pressed may be mistakenly pressed. It may be dangerous to perform fine operation at the time of driving the vehicle because fine operation requires a careful look at the screen. One with poor eyesight may need to move his or her face closer to the screen. It may not be easy for some people to operate the operating keys because the arrangement and sizes thereof are always the same. One may get tired of looking at the display because there is no change in it. All the operating keys may be exactly the same to the touch with fingers in operating them, and thus it may be necessary to visually confirm operation.

According to the vehicle information display device, discrimination of operable input keys is facilitated. However, the vehicle information display device has the same problems as described above. More specifically, it may be difficult to immediately recognize which input key is to be operated. It may be not easy for some people to operate input keys because the arrangement and sizes thereof are always the same.

The present invention has been made in consideration of the prior art drawbacks, and has as its object to provide a man-machine interface technique for allowing easy and reliable operation.

DISCLOSURE OF THE INVENTION

In order to achieve the above-described object of the invention, in a first aspect, the present invention provides a vehicle-mounted man-machine interface device. The vehicle-mounted man-machine interface device of the present invention is basically composed of display means for displaying a screen, press position detecting means for detecting a press position on the screen, control means for displaying, on the display means, an operating screen on which a plurality of operating figures are arranged and acquiring operation content specified by a press on the operating screen from arrangement positions of the operating figures, operations corresponding to the operating figures, and an output from the press position detecting means, and traveling detecting means for detecting whether or not a vehicle having the device is traveling or detecting a traveling speed of the vehicle. The control means operates to set or alter one or both of the number of operating figures simultaneously displayed on the operating screen and sizes of the operating figures according to an output from the traveling detecting means.

An example of the display means is a liquid crystal display or plasma display. An example of the press position detecting means is a touch panel. An example of the operating figures is an operating key figure. Examples of an available operation include operations for executing the functions of receiving AM broadcasts, receiving FM broadcasts, selecting a station, playing an MD, playing a CD, fast forwarding, fast rewinding, pausing, and increasing and decreasing the volume of sound in a CD/MD receiver to which the man-machine interface device is applied.

With this configuration, the man-machine interface device displays an operating screen on which various operating figures are arranged at predetermined positions. When there is any press on the operating screen, the man-machine interface device acquires operation content specified by the press according to arrangement positions of the operating figures, operations corresponding to the operating figures, and an output from the press position detecting means. At this time, as for display of the operating screen, the man-machine interface device sets or alters one or both of the number of operating figures simultaneously displayed on the operating screen and sizes of the operating figures according to whether or not the vehicle is traveling or the traveling speed of the vehicle. This makes it possible to, when the vehicle is traveling, easily and reliably perform operation by displaying operating figures larger than those at the time of stopping or decreasing the number of displayed operating figures.

More specifically, in the man-machine interface device of the present invention, as the operating screen, the control means displays an operating screen at the time of stopping on which a predetermined number of operating figures of predetermined sizes are arranged when the vehicle is not traveling and displays an operating screen at the time of traveling on which larger and fewer operating figures than the operating figures of the operating screen at the time of stopping are arranged when the vehicle is traveling.

Preferably, the control means forms, as the operating screen at the time of traveling, a plurality of operating screens at the time of traveling with different combinations of operating figures arranged and switches among the operating screens at the time of traveling to display one of the operating screens.

More specifically, the operating figures arranged on the operating screen at the time of traveling are some of the operating figures arranged on the operating screen at the time of stopping that are selected in consideration of a frequency of use of or need for each of the operating figures.

If a position different from an arrangement position of any of the operating figures in the operating screen at the time of traveling being displayed is pressed, the control means preferably switches from the displayed screen to another operating screen at the time of traveling or an operating screen for selecting a function which is superior to the operating screens at the time of traveling.

The control means preferably further has means for accepting setting or change of a size or an arrangement position of an operating figure to be arranged on each of the operating screens at the time of traveling or an operating figure arranged on each operating screen at the time of traveling.

Preferably, the control means is characterized by displaying, as the operating screen at the time of traveling, an operating screen in which a size or an arrangement position of an operating figure to be arranged or an operating figure arranged is set according to a history of the setting or change.

The control means is characterized by displaying, as the operating screen at the time of traveling, an operating screen in which an operating figure to be arranged is set according to a history of operation of each of the operating figures.

The vehicle-mounted man-machine interface device of the present invention preferably further has means for exchanging the history with another device.

In the vehicle-mounted man-machine interface device of the present invention, the traveling detecting means typically detects whether or not the vehicle is traveling or detecting the traveling speed of the vehicle according to an output from a vehicle speed pulse generator, a vehicle speedometer, or means for detecting operation of a parking brake.

In the vehicle-mounted man-machine interface device of the present invention, the control means can display information related to operation with each of the operating figures on the operating screen and at the same time, alter one or both of content and a size of the displayed information according to an output from the traveling detecting means.

In a second aspect, the present invention can be recognized as a computer program capable of causing a computer to function as means constituting the vehicle-mounted man-machine interface device.

In a third aspect, the present invention can be recognized as a method of performing man-machine interface processing. In this case, the man-machine interface method according to the present invention comprises a step of displaying, on display means, an operating screen on which a plurality of operating figures are arranged, a step of acquiring operation content specified by a press on the operating screen from arrangement positions of the operating figures, operations corresponding to the operating figures, and an output from press position detecting means for detecting a position of the press, a traveling detecting step of detecting whether or not a vehicle having a vehicle-mounted device is traveling or detecting a traveling speed of the vehicle, and a step of altering one or both of the number of operating figures simultaneously displayed on the operating screen and sizes of the operating figures according to a detection result obtained in the traveling detecting step.

Since the present invention adopts the above-described configuration, it can implement a man-machine interface capable of easily and reliably performing operation.

EMBODIMENTS OF THE INVENTION

An embodiment of the present invention will be explained below in a specific and detailed manner with reference to the drawings.

Figure 1:
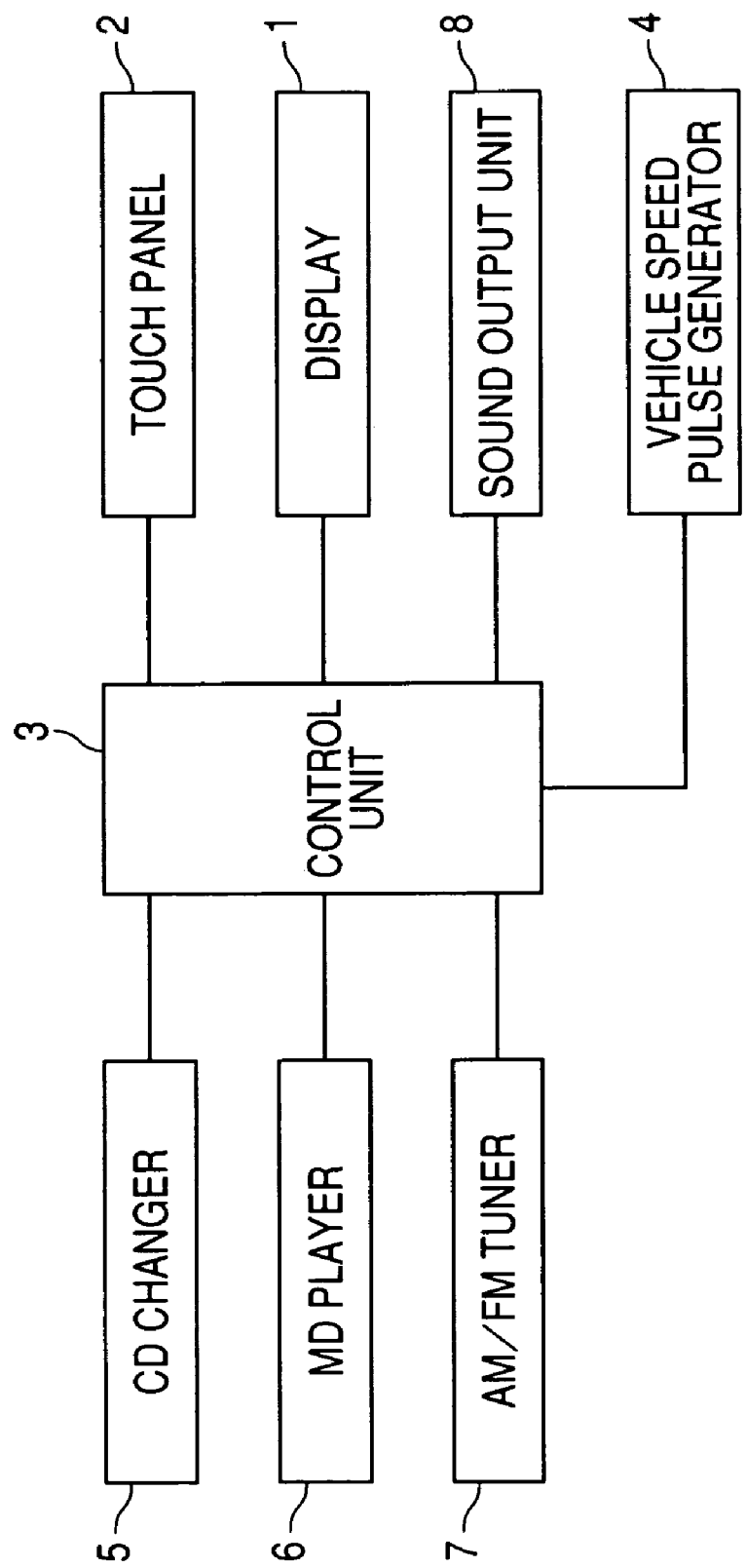
FIG. 1 is a block diagram showing the configuration of a CD/MD receiver according to one embodiment of the present invention.

FIG. 1 is a block diagram showing the configuration of a CD/MD receiver according to one embodiment of the present invention. As shown in FIG. 1, the CD/MD receiver comprises a display 1 for displaying a screen, a touch panel 2 for inputting information related to a press position on a screen, and a control unit 3 which displays an operating screen on which various operating keys associated with respective available operations are arranged at predetermined positions and determines operation content in accordance with an input with the touch panel 2. The control unit 3 comprises a CPU which performs processing in accordance with a program, an image processing processor which performs the process of writing data in a VRAM to display an image on the display 1, a ROM and a RAM which store programs and data, an interface for acquiring data from, e.g., the touch panel 2, and the like. The display 1, touch panel 2, control unit 3, and the like constitute a man-machine interface.

The CD/MD receiver further comprises a vehicle speed pulse generator 4 which outputs, as information related to the traveling speed of a vehicle having the CD/MD receiver, a vehicle speed pulse of a frequency corresponding to the traveling speed. The control unit 3 determines according to the vehicle speed pulse whether the vehicle is traveling or at a stop and determines the number of operating keys simultaneously displayed on an operating screen or their sizes according to the determination result. The CD/MD receiver also comprises a CD changer 5, an MD player 6, and an AM/FM tuner 7 which are controlled by the control unit 3 in accordance with operation content depending on an input with the touch panel 2. Reference numeral 8 in FIG. 1 denotes a sound output unit which converts an audio signal from the CD changer 5 or the like into sound and outputs the sound.

Figure 2:
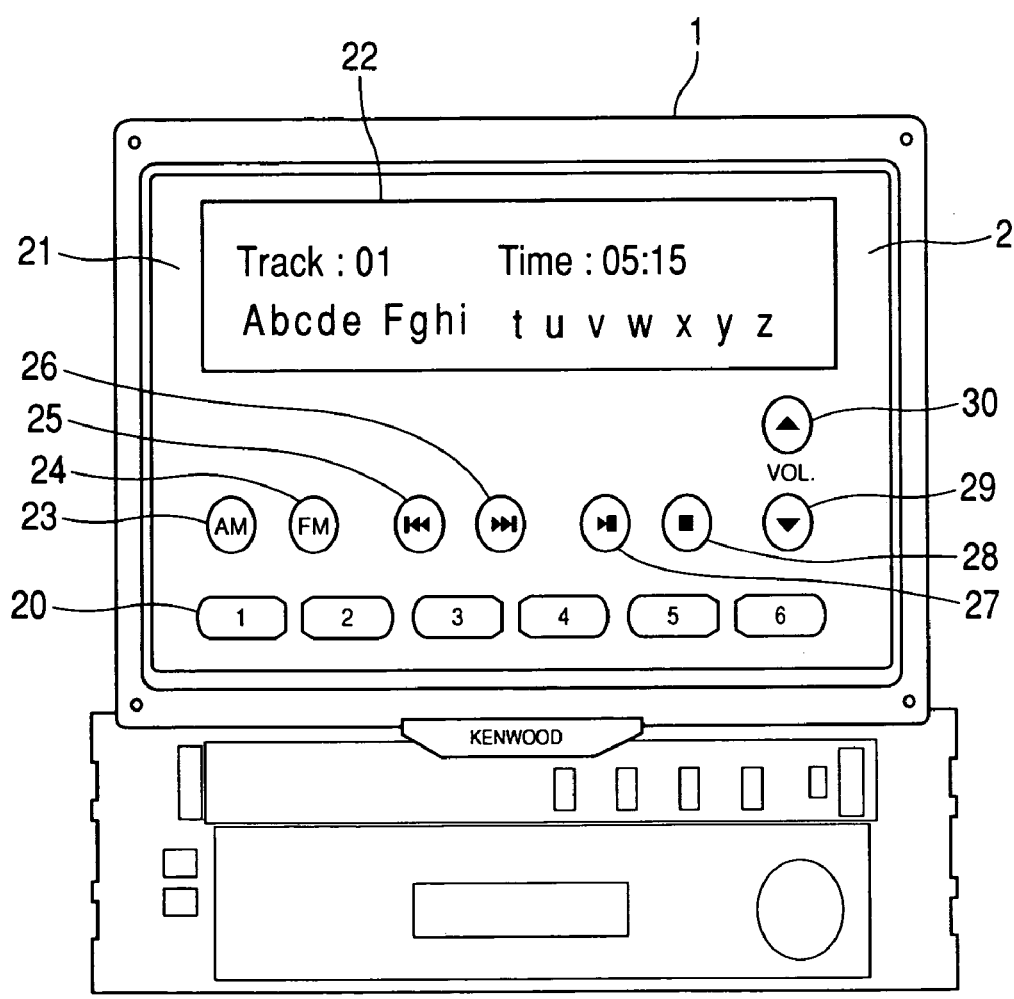
FIG. 2 is a view illustrating an operating screen at the time of stopping while the function of playing a CD or MD in the device of FIG. 1 is being executed.

FIGS. 2 to 6 illustrate operating screens to be displayed on the display 1. When the vehicle is at a stop, the control unit 3 displays, according to a vehicle speed pulse, an operating screen 21 at the time of stopping on which operating keys, the sizes and the number of which can be seen from FIG. 2, are arranged. When the vehicle is traveling, the control unit 3 displays an operating screen at the time of traveling as shown in each of FIGS. 3 to 6 on which larger and fewer operating keys than those of the operating screen 21 at the time of stopping are arranged. That is, the control unit 3 switches among a plurality of operating screens with different combinations of operating keys arranged and displays one of them. In each operating screen at the time of traveling, CD select keys 20 are not displayed in consideration of the frequency of operation, need, display space, and the like.

FIG. 2 shows the operating screen 21 at the time of stopping while the function of playing a CD or MD is being executed. The operating screen 21 at the time of stopping is configured to allow a user to perform operation input by pressing an operating key on the operating screen 21 at the time of stopping from above the touch panel 2. The operating screen 21 at the time of stopping includes display of an information display area 22 for displaying various pieces of information to a user and various operating keys. The number of a track being played, an elapsed playing time, an artist name, and a song title are displayed in the information display area 22.

As various operating keys, an AM key 23 for executing the function of receiving AM broadcasts, an FM key 24 for executing the function of receiving FM broadcasts, a rewind key 25 for fast rewinding or skipping to the beginning of a song being played or a preceding song, a forward key 26 for fast forwarding or skipping to the beginning of a succeeding song, a play/pause key 27 for starting and temporarily stopping playing, a stop key 28 for stopping playing, a volume down key 29 for decreasing the volume of sound output from the sound output unit 8, a volume up key 30 for increasing the volume, and the CD select keys 20 for selecting a CD in the CD changer 5 are displayed in the operating screen 21 at the time of stopping. As the CD select keys 20, six keys numbered from 1 to 6 are displayed to allow selection of one of six CDs which can be held.

Figure 3:
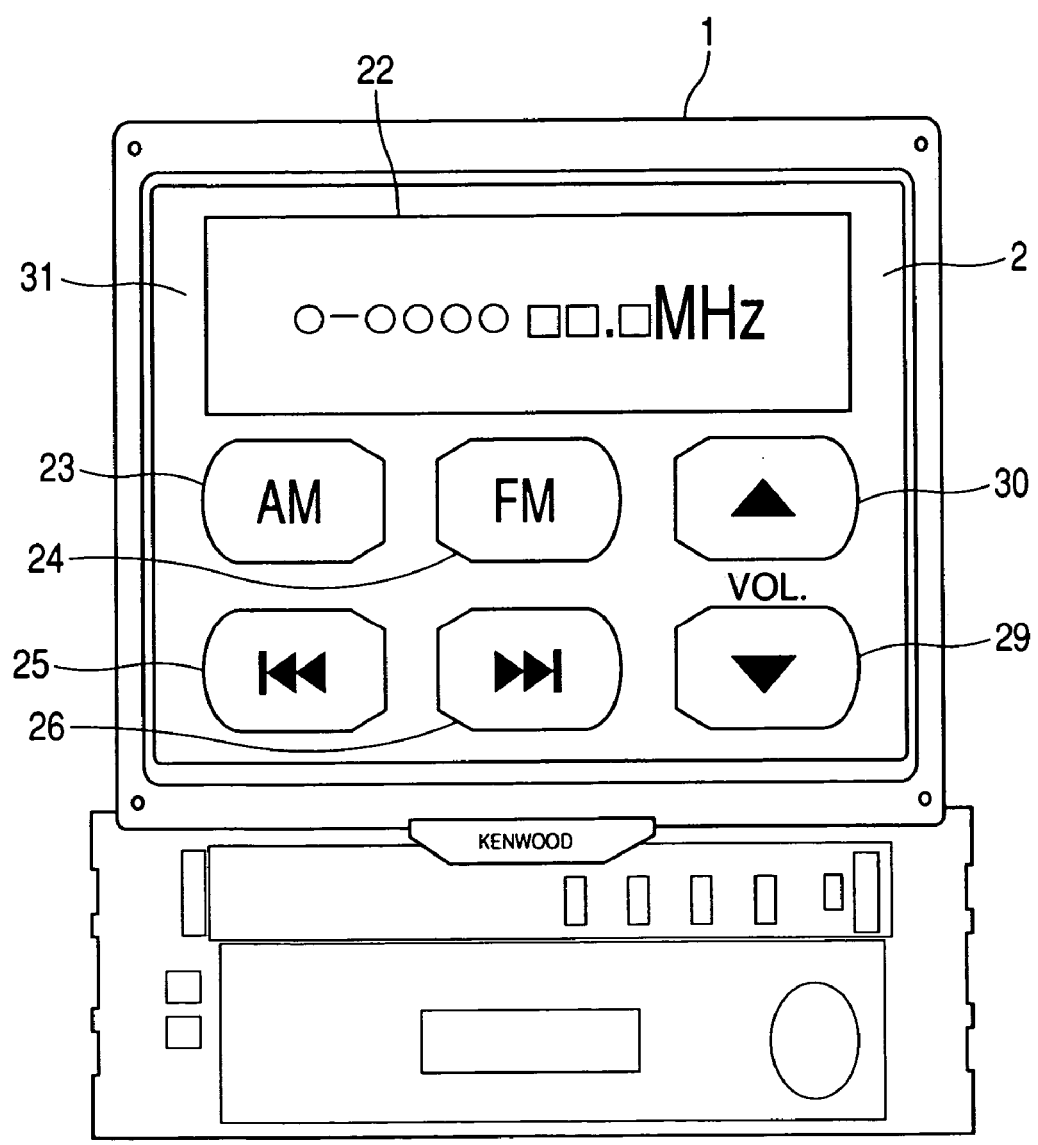
FIG. 3 is a view illustrating a tuner operating screen displayed when executing the function of receiving AM or FM broadcasts in the device of FIG. 1.

FIG. 3 shows a tuner operating screen 31 displayed when executing the function of receiving AM or FM broadcasts. Only the name of a broadcasting station and a frequency are displayed in the information display area 22 of the screen. As operating keys, only the AM key 23, FM key 24, rewind key 25, forward key 26, volume down key 29, and volume up key 30 are displayed. Note that in this case, the rewind key 25 and forward key 26 are used as station select keys for performing station selection.

Figure 4:
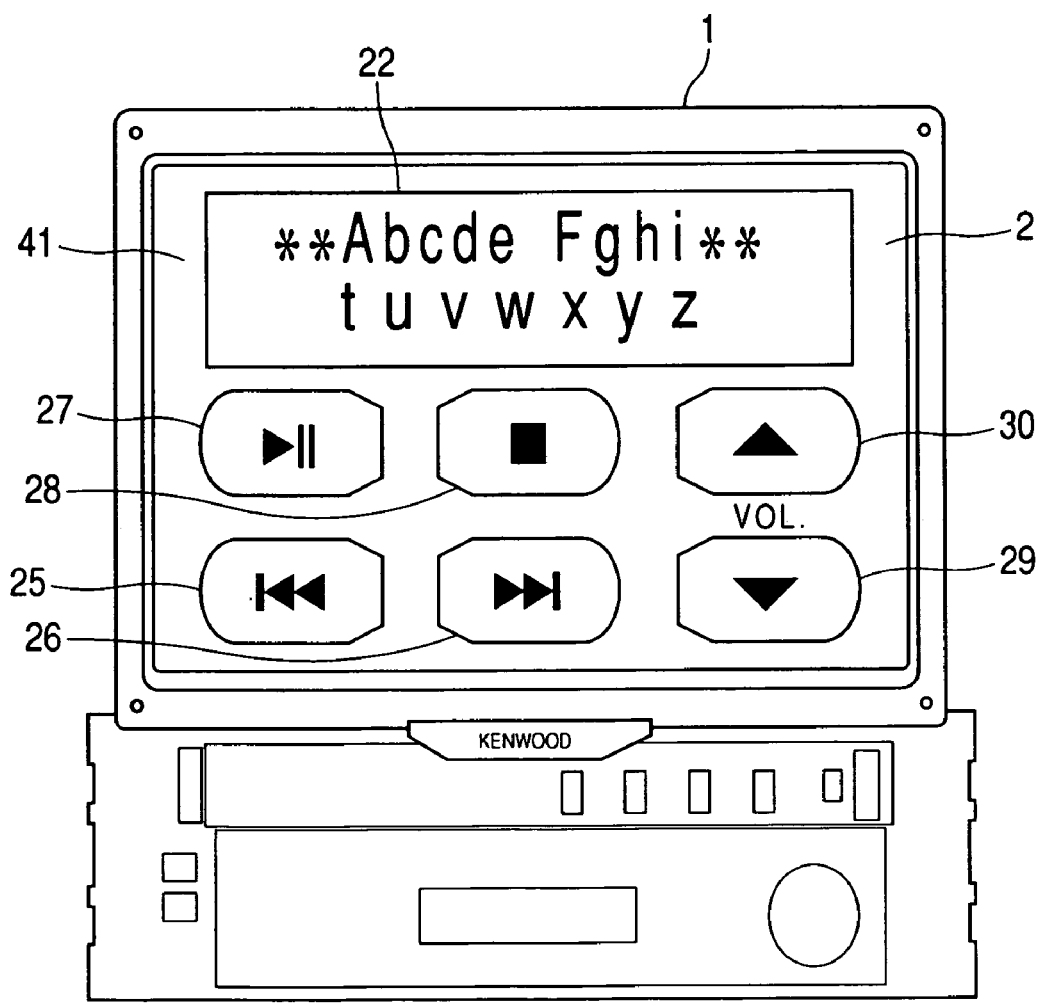
FIG. 4 is a view illustrating a CD/MD operating screen displayed when executing the function of playing a CD or MD in the device of FIG. 1.

FIG. 4 shows a CD/MD operating screen 41 displayed when executing the function of playing a CD or MD. Only an artist name and a song title are displayed in the information display area 22. As operating keys, only the rewind key 25, forward key 26, play/pause key 27, stop key 28, volume down key 29, and volume up key 30 are displayed.

Figure 5:
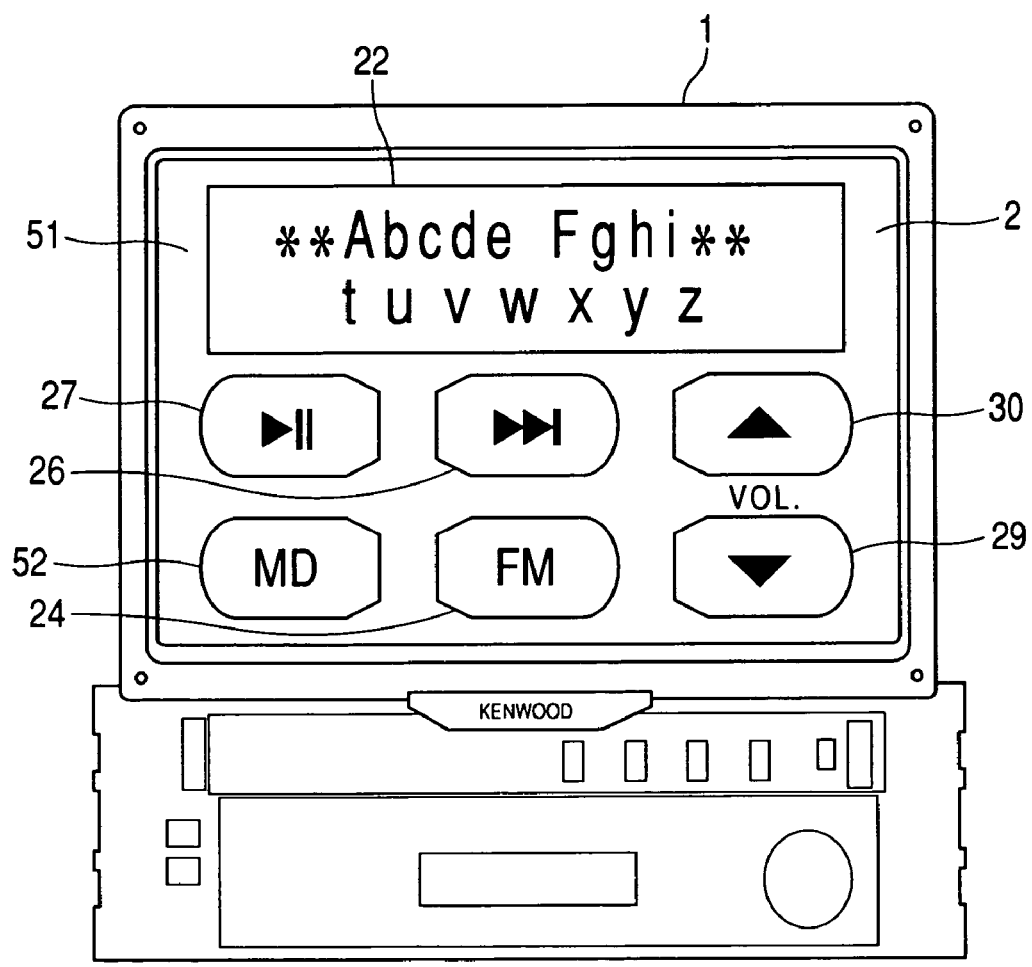
FIG. 5 is a view illustrating a specific operating screen specific to a user in the device of FIG. 1.

FIG. 5 shows a specific operating screen 51 specific to a user on which operating keys determined to be used with the highest frequency according to a history of use by the user are arranged. Reference numeral 52 in FIG. 5 denotes an MD key for executing the function of playing an MD. Only an artist name and a song title are displayed in the information display area 22. As operating keys, the MD key 52, FM key 24, forward key 26, play/pause key 27, volume down key 29, and volume up key 30 are displayed.

Figure 6:
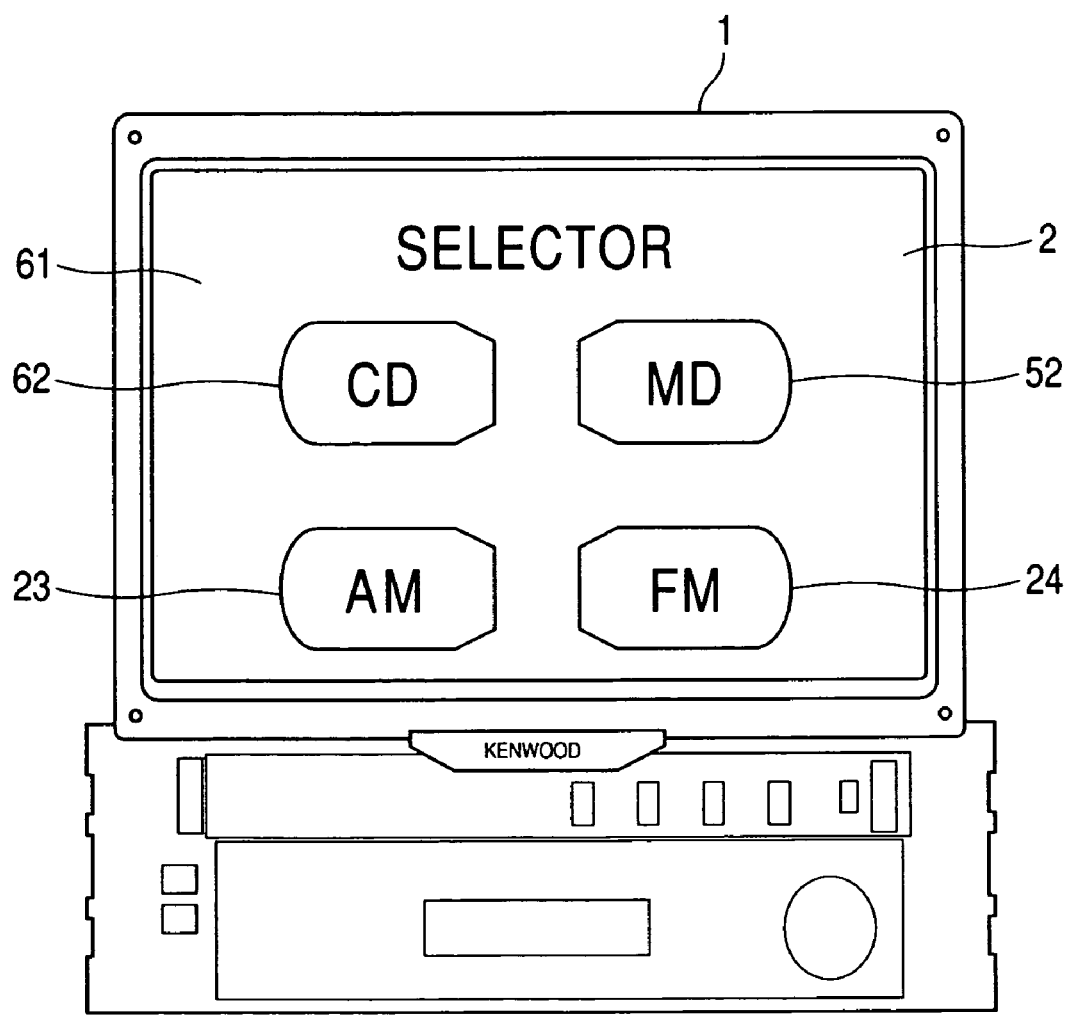
FIG. 6 is a view illustrating a selector operating screen for selecting the CD playing function, MD playing function, AM receiving function, or FM receiving function in the device of FIG. 1.

FIG. 6 shows a selector operating screen 61 for selecting the CD playing function, MD playing function, AM receiving function, or FM receiving function as desired. Reference numeral 62 in FIG. 6 denotes a CD key for selecting and executing the CD playing function of the CD player 5. Only the CD key 62, MD key 52, AM key 23, and FM key 24 are displayed on the operating screen of FIG. 6.

Figure 7:
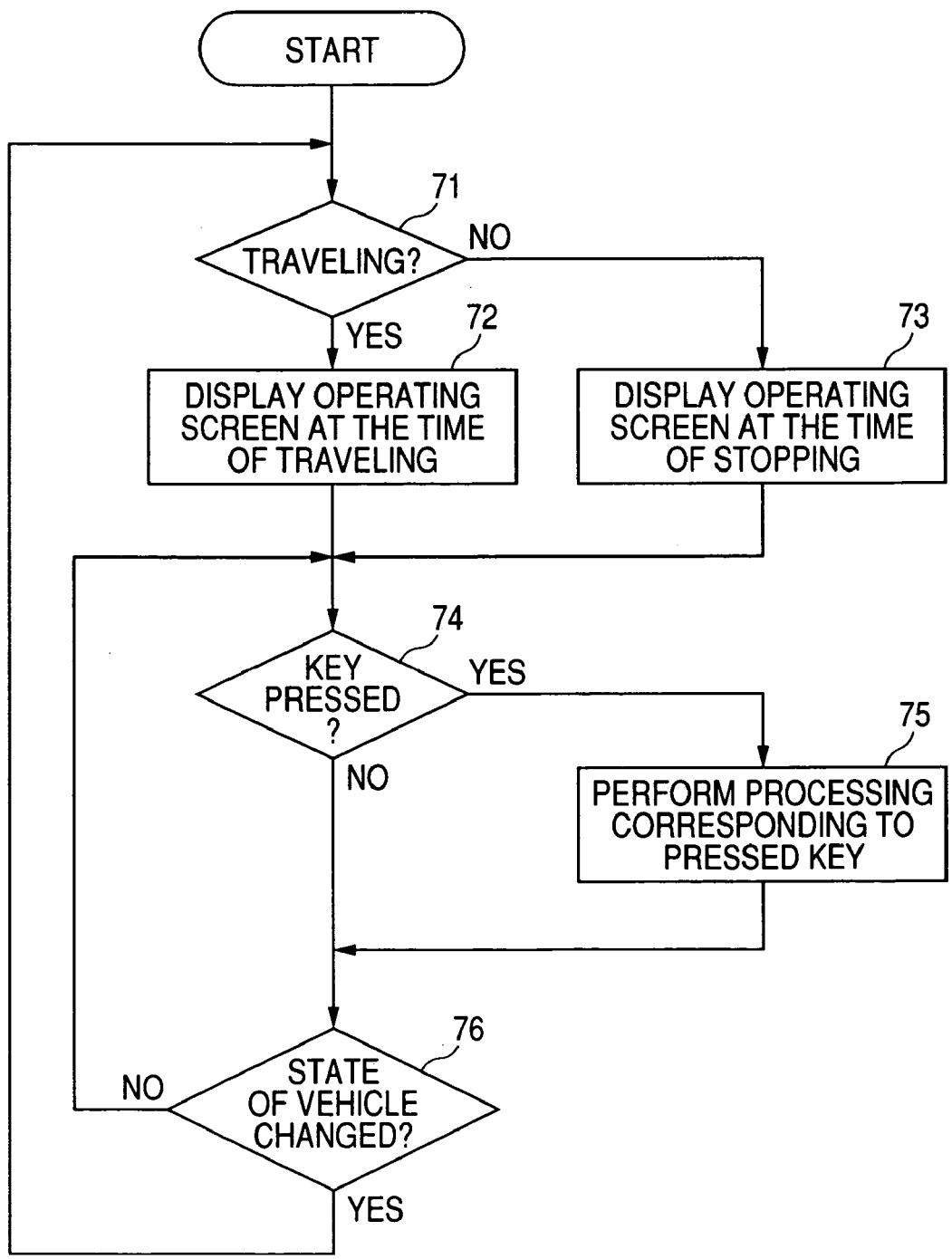
FIG. 7 is a flowchart showing the processing by a control unit in the device of FIG. 1.

FIG. 7 is a flowchart showing the processing in the control unit 3. The processing is performed by the CPU of the control unit 3 in accordance with a program. In the processing, in step 71, it is determined whether or not the vehicle having the CD/MD receiver is traveling. The determination can be made by a vehicle speed pulse from the vehicle speed pulse generator 4. If it is determined that the vehicle is traveling, the flow advances to step 72. In step 72, the selector operating screen 61 of FIG. 6 or an operating screen at the time of traveling as in FIGS. 3 to 5 is displayed as display of an operating screen at the time of traveling, and the flow advances to step 74. On the other hand, if it is determined that the vehicle is not traveling, the flow advances to step 73. In step 73, a predetermined start screen or the operating screen 21 at the time of stopping as in FIG. 2 is displayed, and the flow advances to step 74.

In step 74, it is determined whether or not any key has been pressed. If it is determined that no key has been pressed, the flow advances directly to step 76. On the other hand, if it is determined that any key has been pressed, processing corresponding to the pressed key is performed in step 75. After that, the flow advances to step 76.

In step 75, for example, if the pressed operating key is the FM key in the operating screen 21 at the time of stopping, the FM broadcast receiving function is executed. If the pressed key is the forward key 26 in the tuner operating screen 31, the function of automatically selecting a station in a direction increasing the receive frequency is executed. If the pressed key is the rewind key 25 in the CD/MD operating screen 41, the function of skipping to the beginning of a song being played or a preceding song is executed. If the pressed key is the volume down key 29 in the specific operating screen 51, the function of decreasing the volume of output sound is executed. If the pressed key is the CD key 62, MD key 52, AM key 23, or FM key 24 in the selector operating screen 61, the CD playing function, MD playing function, AM broadcast receiving function, or FM broadcast receiving function is executed, and the current operating screen is switched to the CD/MD operating screen 41 or tuner operating screen 31 corresponding to the executed function. At this time, if the executed function is available in the specific operating screen 51, the current operating screen can be switched to the specific operating screen 51.

Whether or not the specific operating screen 51 is available can be determined according to the frequency in the use of each operating key obtained from a record made in advance of the accumulated value of the number of use of the operating key as a history of use. For example, if there are several operating keys whose frequencies of use are equal to or higher than a predetermined value, the specific operating screen 51 on which the operating keys are arranged can be formed and used. More specifically, if the MD key 52, FM key 24, play/pause key 27, and forward key 26 are used with a frequency which is the highest and a predetermined number of times or more higher than any other operating key when using the CD playing function, it can be determined that the specific operating screen on which the operating keys are arranged can be used as an operating screen when executing the CD function. The specific operating screen 51 of FIG. 5 is an example of one, the settings of which are made in this manner. Note that the volume down key 29 and volume up key 30 are always necessary, they are always displayed regardless of their frequencies of use.

In step 76, it is determined whether or not the state of the vehicle having the CD/MD receiver has changed from one of a traveling state and a stop state to the other one. The determination can be made according to a vehicle speed pulse from the vehicle speed pulse generator 4. If it is determined that the state has changed, the flow returns to step 71; otherwise, the flow returns to step 74.

According to this embodiment, while the vehicle is traveling, the operating screen 31, 41, or 51 at the time of traveling on which larger and fewer operating keys than those of the operating screen 21 at the time of stopping are arranged, and only important ones selected from pieces of information are displayed on an enlarged scale in the information display area 22 is displayed as the current operating screen. This makes it possible to easily recognize and reliably operate an operating key or displayed information and also to perform operation even without looking at the operating screen.

Also, the learning function allows use of the specific operating screen 51 on which operating keys whose frequencies of use are high are arranged, and thus, the operability can be improved. Additionally, since the current operating screen differs according to whether the vehicle is at a stop or traveling, weariness with the screen can be prevented. Moreover, the specific operating screen 51 is displayed differently depending on the user, and thus, the individuality of the user can be reflected in the operating screen.

Note that the present invention is not limited to the above-described embodiment and can also be carried out by making appropriate modification to the invention. For example, in the above description, a vehicle speed pulse from the vehicle speed pulse generator 4 is used to determine whether the vehicle is at a stop or traveling. An output from a speedometer or an output from means for detecting operation of a parking brake may be used instead.

In the above description, predetermined operating keys or operating keys determined by their frequencies of operation are arranged on each operating screen at the time of traveling. Instead, means for allowing determination of the types and number of operating keys arranged by a user, the arrangement positions of the operating keys, their sizes, and the like and creation and registration of a desired operating screen at the time of traveling may be provided such that an operating screen created and registered in this manner can be displayed when the vehicle is traveling. For example, there can be used, as such means, means for displaying a setting screen on which the types and number of operating keys, their arrangement, their sizes, and the like are displayed as a sample and which allows specification of a desired one by touching it and accepting settings. This makes it possible to display an operating screen at the time of traveling more suited to user preferences and thus to further improve the usability.

In this case, the types and number of operating keys, their arrangement, their sizes, and the like determined by a user may be stored in addition to the frequencies of use of the operating keys, and the specific operating screen 51, in which user preferences have been reflected, may be created and displayed according to these stored data. This makes it possible to automatically display an operating screen at the time of traveling more suited to user preferences and thus to provide a more usable man-machine interface. To exchange stored data with another device, means for outputting data to a memory card or the like or inputting data from a memory card may be provided. This makes it possible to display the specific operating screen 51 suited to user preferences even in another vehicle.

The description has made no particular reference to a case where a portion other than operating keys is pressed at the time of traveling. In that case, the current operating screen may be switched to the selector operating screen or another operating screen at the time of traveling.

INDUSTRIAL APPLICABILITY

According to the present invention, there can be provided a man-machine interface technique for easily and reliably performing operation in a vehicle-mounted device.

The invention claimed is:

1. A vehicle-mounted man-machine interface device comprising:
   a display unit adapted to display a screen;
   a press position detection unit adapted to detect a press position on the screen;
   a control unit adapted to display, on said display unit,
   an operating screen on which a plurality of operating figures are arranged and for acquiring operation content specified by a press on the operating screen on the basis of arrangement positions of the operating figures, operations corresponding to the operating figures, and an output from said press position detection unit; and
   traveling detection unit adapted to detect whether or not a vehicle having the vehicle-mounted man-machine interface device is traveling or for detecting a traveling speed of the vehicle,
   wherein said control unit has a part for setting or altering one or both of the number of operating figures simultaneously displayed on the operating screen and sizes of the operating figures on the basis of an output from said traveling detection unit,
   wherein as the operating screen, said control unit displays an operating screen at the time of stopping on which a predetermined number of operating figures of predetermined sizes are arranged when the vehicle is not traveling and displays an operating screen at the time of traveling on which larger and fewer operating figures than the operating figures of the operating screen at the time of stopping are arranged when the vehicle is traveling the operating figures arranged on the operating screen at the time of traveling being some of the operating figures arranged on the operating screen at the time of stopping that are selected in consideration of a frequency of use of or need for each of the operating figures, and
   wherein said control unit displays, as the operating screen at the time of traveling, an operating screen in which an operating figure to be arranged is set according to a history of operation of each of the operating figures.

2. The vehicle-mounted man-machine interface device according to claim 1, wherein said control unit forms, as the operating screen at the time of traveling, a plurality of operating screens at the time of traveling with different combinations of operating figures arranged and switches among the operating screens at the time of traveling to display one of the operating screens.

3. The vehicle-mounted man-machine interface device according to claim 2, wherein if a position different from an arrangement position of any of the operating figures in the operating screen at the time of traveling being displayed is pressed, said control unit switches from the displayed screen to another operating screen at the time of traveling or an operating screen for selecting a function which is superior to the operating screens at the time of traveling.

4. The vehicle-mounted man-machine interface device according to claim 2, wherein said control unit has a part for accepting setting or change of a size or an arrangement position of an operating figure to be arranged on each of the operating screens at the time of traveling or an operating figure arranged on each operating screen at the time of traveling.

5. The vehicle-mounted man-machine interface device according to claim 4, wherein said control unit displays, as the operating screen at the time of traveling, an operating screen in which a size or an arrangement position of an operating figure to be arranged or an operating figure arranged is set according to a history of the setting or change.

6. The vehicle-mounted man-machine interface according to any one of claims 1, 2 and 3-5, wherein said control unit displays, as the operating screen at the time of traveling, an operating screen in which an operating figure to be arranged is set according to a history of operation of each of the operating figures.

7. The vehicle-mounted man-machine interface device according to claim 5, having a unit adapted to exchange the history with another device.

8. The vehicle-mounted man-machine interface device according to claim 1 or 2, wherein said traveling detection unit detects whether or not the vehicle is traveling or detecting the traveling speed of the vehicle according to an output from a vehicle speed pulse generator, a vehicle speedometer, or a part for detecting operation of a parking brake.

9. The vehicle-mounted man-machine interface device according to claim 1 or 2, wherein said control unit displays information related to operation with each of the operating figures on the operating screen and at the same time, alters one or both of content and a size of the displayed information according to an output from said traveling detection unit.

10. A man-machine interface method performed by a vehicle-mounted device, the method comprising the steps of:
displaying, on display means, an operating screen on which a plurality of operating figures are arranged;
acquiring operation content specified by a press on the operating screen on the basis of arrangement positions of the operating figures, operations corresponding to the operating figures, and an output from press position detecting means for detecting a position of the press;
detecting whether or not a vehicle having the vehicle-mounted device is traveling or detecting a traveling speed of the vehicle; and
altering one or both of the number of operating figures simultaneously displayed on the operating screen and sizes of the operating figures on the basis of a detection result obtained in the traveling detecting step, wherein as the operating screen, said altering step performs to display an operating screen at the time of stopping on which a predetermined number of operating figures of predetermined sizes are arranged when the vehicle is not traveling and displays an operating screen at the time of traveling on which larger and fewer operating figures than the operating figures of the operating screen at the time of stopping are arranged when the vehicle is traveling, the operating figures arranged on the operating screen at the time of traveling being some of the operating figures arranged on the operating screen at the time of stopping that are selected in consideration of a frequency of use of or need for each of the operating figures,
wherein in said altering step, as the operating screen at the time of traveling, an operating screen in which an operating figure to be arranged is set according to a history of operation of each of the operating figures, is displayed.

* * * * *